(12) United States Patent
Packard et al.

(10) Patent No.: US 7,751,162 B1
(45) Date of Patent: *Jul. 6, 2010

(54) PROTECTIVE DEVICE WITH MISWIRE PROTECTION

(75) Inventors: Thomas N. Packard, Syracuse, NY (US); Daniel P. Malley, Freeville, NY (US); David A. Finlay, Sr., Marietta, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 11/865,130

(22) Filed: Oct. 1, 2007

Related U.S. Application Data

(63) Continuation of application No. 11/063,067, filed on Feb. 22, 2005, now Pat. No. 7,295,410, which is a continuation-in-part of application No. 10/964,217, filed on Oct. 13, 2004, now Pat. No. 7,239,491.

(51) Int. Cl.
*H02H 3/00* (2006.01)
(52) U.S. Cl. ............................. 361/42; 361/45
(58) Field of Classification Search ................ 361/42, 361/45, 49
See application file for complete search history.

(56) References Cited

U.S. PATENT DOCUMENTS

| | | | |
|---|---|---|---|
| 4,477,857 A | 10/1984 | Crocker | |
| 5,363,083 A | 11/1994 | Fischer | |
| 5,541,800 A * | 7/1996 | Misencik | 361/45 |
| 5,923,239 A | 7/1999 | Krueger et al. | |
| 6,043,966 A | 3/2000 | Krueger et al. | |
| 6,246,558 B1 | 6/2001 | DiSalvo et al. | |
| 6,317,307 B1 | 11/2001 | Bone et al. | |
| 6,492,894 B2 | 12/2002 | Bone et al. | |
| 6,674,289 B2 * | 1/2004 | Macbeth | 324/509 |
| 6,721,156 B2 | 4/2004 | Masghati | |
| 6,724,590 B1 * | 4/2004 | Radosavljevic et al. | 361/42 |
| 6,754,590 B1 * | 6/2004 | Moldoveanu | 702/14 |
| 6,807,036 B2 | 10/2004 | Baldwin | |

(Continued)

*Primary Examiner*—Jared J Fureman
*Assistant Examiner*—Christopher J Clark
(74) *Attorney, Agent, or Firm*—Daniel P. Malley; Bond, Schoeneck & King, PLLC

(57) ABSTRACT

The present invention is directed to a device that includes a housing assembly including a plurality of line terminals, a plurality of load terminals, and a plurality of receptacle load terminals coupled to the plurality of load terminals by a plurality of conductors. A circuit interrupting assembly is disposed in the housing and coupled to the plurality of line terminals or the plurality of load terminals, the circuit interrupting assembly establishing electrically continuity between the plurality of line terminals and the plurality of load terminals in a reset state and interrupting the electrical continuity between the plurality of line terminals and the plurality of load terminals in a tripped state. A wiring state detection circuit is coupled to the plurality of line terminals or the plurality of load terminals. At least one switchable element is coupled to the wiring state detection circuit, the at least one switchable element including a plurality of switching states. The at least one switchable element is disposed in at least one of the plurality of conductors coupled between the plurality of receptacle load terminals and the plurality of load terminals. The at least one switchable element is also configured to change switching states in response to a stimulus generated by the wiring state detection circuit.

25 Claims, 6 Drawing Sheets

U.S. PATENT DOCUMENTS

| | | |
|---|---|---|
| 6,958,895 B1 | 10/2005 | Radosavljevic et al. |
| 7,049,910 B2 * | 5/2006 | Campolo et al. ............... 335/18 |
| 7,173,799 B1 | 2/2007 | Weeks et al. |
| 7,292,419 B1 * | 11/2007 | Nemir .......................... 361/42 |
| 7,295,410 B1 * | 11/2007 | Packard et al. ................. 361/42 |
| 7,498,909 B2 * | 3/2009 | Zhang et al. ................... 335/18 |
| 2002/0071228 A1 * | 6/2002 | Campolo et al. ............... 361/42 |
| 2003/0048620 A1 | 3/2003 | Nishimura et al. |
| 2005/0117264 A1 * | 6/2005 | Aromin ........................ 361/42 |
| 2009/0161271 A1 * | 6/2009 | Huang et al. .................. 361/42 |

* cited by examiner

PROTECTIVE DEVICE WITH MISWIRE PROTECTION

CROSS-REFERENCE TO RELATED APPLICATIONS

This is a continuation of U.S. patent application Ser. No. 11/063,067, filed on Feb. 22, 2005, now U.S. Pat. No. 7,295,410 U.S. patent application Ser. No. 11/063,067 is a continuation-in-part of U.S. patent application Ser. No. 10/964,217, filed on Oct. 13, 2004, now U.S. Pat. No. 7,239,491 the contents of which is relied upon and incorporated herein by reference in their entirety, and the benefit of priority under 35 U.S.C. §120 is hereby claimed.

BACKGROUND OF THE INVENTION

1. Field of the Invention

The present invention relates generally to wiring devices, and particularly to protective wiring devices.

2. Technical Background

Electrical distribution systems that provide power to a house, building or some other facility include one or more breaker panels coupled to a source of AC power. The breaker panel provides AC power to one or more branch electric circuits installed in the structure. The electric circuits may typically include one or more receptacle outlets and may further transmit AC power to one or more electrically powered devices, commonly referred to in the art as load circuits. The receptacle outlets provide power to user-accessible loads that include a power cord and plug. Because certain types of faults have been known to occur in electrical wiring systems, each electric circuit typically employs one or more electric circuit protection devices. The most common protective device is a ground fault circuit interrupter (GFCI).

Both receptacle wiring devices and electric circuit protective wiring devices are disposed in an electrically non-conductive housing. The housing includes electrical terminals that are electrically insulated from each other. Line terminals couple the wiring device to wiring that provides AC electrical power from the breaker panel. Load terminals are coupled to wiring that directs AC power to one or more electrical loads. Load terminals may also be referred to as "feed through" terminals because the wires connected to these terminals may be coupled to a daisy-chained configuration of receptacles or switches. The load may ultimately be connected at the far end of this arrangement. As alluded to above, power may be accessed by "user accessible" load terminals, commonly referred to as "receptacle terminals." The receptacle terminals are in communication with receptacle openings disposed on the face of the housing. This arrangement allows a user to insert an appliance plug into the receptacle openings to thereby energize the device.

As noted above, there are several types of electric circuit protection devices. For example, such devices include ground fault circuit interrupters (GFCIs), ground-fault equipment protectors (GFEPs), and arc fault circuit interrupters (AFCIs). This list includes representative examples and is not meant to be exhaustive. Some devices include both GFCIs and AFCIs. As their names suggest, arc fault circuit interrupters (AFCIs), ground-fault equipment protectors (GFEPs) and ground fault circuit interrupters (GFCIs) perform different protective functions.

An arc fault typically manifests itself as a high frequency current signal. Accordingly, an AFCI may be configured to detect various high frequency signals and de-energize the electrical circuit in response thereto.

A ground fault occurs when a current carrying (hot) conductor creates an unintended current path to ground. A differential current is created between the hot/neutral conductors because some of the current flowing in the circuit is diverted into the unintended current path. The unintended current path represents an electrical shock hazard. Ground faults, as well as arc faults, may also result in fire.

A "grounded neutral" is another type of ground fault. This type of fault may occur when the load neutral terminal, or a conductor connected to the load neutral terminal, becomes grounded. While this condition does not represent an immediate shock hazard, it may lead to serious hazard. As noted above, a GFCI will trip under normal conditions when the differential current is greater than or equal to approximately 6 mA. However, when the load neutral conductor is grounded the GFCI becomes de-sensitized because some of the return path current is diverted to ground. When this happens, it may take up to 30 mA of differential current before the GFCI trips. Therefore, if a double-fault condition occurs, i.e., if the user comes into contact with a hot conductor (the first fault) when simultaneously contacting a neutral conductor that has been grounded on the load side (the second fault), the user may experience serious injury or death.

One problem that is associated with protective devices relates to the protective device being miswired, or reverse wired, in the field by an installer. Miswiring refers to a situation wherein an installer connects the line terminals to the load side of the electric circuit and connects the load terminals to the AC power source. Miswiring may result in the protective device not protecting the user from the fault conditions described above. Labels and installation instruction sheets have been used to prevent miswiring. However, instructive material may be ignored by an installer.

Another problem is that protective devices, like all electrical devices, have a limited life expectancy. When the device has reached end of life, certain components may fail, such that the user may not be protected from the fault condition. End of life failure modes include failure of device circuitry, failure of the relay solenoid, and/or failure of the solenoid driving device, typically a silicon controlled rectifier (SCR). Test buttons have been incorporated into protective devices to provide the user with a means for testing the effectiveness of the device. One drawback to this approach lies in the fact that if the user fails to use the test button, the user will not know if the device is functional. Even if the test is performed, the test results may be ignored by the user for various reasons.

What is needed is a protective device configured to reliably protect the user from a fault condition in the electrical power distribution system. A protective device is needed that is configured to detect, and indicate, that a miswire condition is extant. A protective device is further needed that denies power to the portion of the electrical power distribution system experiencing the fault condition. Further, a protective device is needed that is equipped to decouple the load terminals from the line terminals in the event of an end of life condition.

SUMMARY OF THE INVENTION

The present invention addresses the needs described above by providing a protective device configured to reliably protect the user from a fault condition in the electrical power distribution system. The protective device of the present invention is configured to detect, and indicate, that a miswire condition is extant. The present invention denies power to the portion of the electrical power distribution system experiencing the fault condition. Further, the present invention is equipped to decouple the load terminals from the line terminals in the event of an end of life condition.

One aspect of the present invention is directed to an electrical wiring protection device that includes a housing assembly including a plurality of line terminals, a plurality of load terminals, and a plurality of receptacle load terminals. A fault detection circuit is coupled to at least one of the plurality of line terminals. The fault detection circuit is configured to generate a fault detection signal in response to detecting at least one fault condition. A first interrupting contact assembly is coupled to the fault detection circuit. The first interrupting contact assembly includes first interrupting contacts disposed between the plurality of line terminals and the plurality of load terminals. The first interrupting contacts are configured to electrically couple the plurality of line terminals and the plurality of load terminals in a reset condition. The first interrupting contacts are configured to decouple the plurality of line terminals from the plurality of load terminals in response to the fault detection signal in a tripped state. A wiring state detection circuit is coupled to at least one of the plurality of line terminals. The miswire detection circuit is configured to generate a first wiring signal when the plurality of line terminals are connected to a source of AC power. A second interrupting contact assembly is coupled to the wiring state detection circuit. The second interrupting contact assembly includes second interrupting contacts disposed between at least one of the plurality of receptacle load terminals and at least one of the plurality of feed-through load terminals. The second interrupting contacts are configured to electrically couple the at least one receptacle load terminal to the at least one feed-through load terminal in response to the first wiring signal.

In another aspect, the present invention includes a method for protecting a user from a fault condition in an electrical circuit. The method includes providing an electrical wiring protection device that includes a housing assembly having a plurality of line terminals, a plurality of load terminals, and a plurality of receptacle load terminals. The electrical wiring protection device also includes first interrupting contacts disposed between the plurality of line terminals and the plurality of load terminals. Second interrupting contacts are disposed between at least one of the plurality of receptacle load terminals and at least one of the plurality of feed-through load terminals. The second interrupting contacts are initially disposed in an open state. A wiring status signal is provided that is configured to indicate whether the plurality of line terminals are coupled to the source of AC power. The second interrupting contacts are closed in response to the wiring status signal indicating that the plurality of line terminals are coupled to the source of AC power.

In another aspect, the present invention includes a method for protecting a user from a fault condition in an electrical circuit. The method includes providing an electrical wiring protection device that includes a housing assembly having a plurality of line terminals, a plurality of load terminals, and a plurality of receptacle load terminals. The electrical wiring protection device also includes first interrupting contacts disposed between the plurality of line terminals and the plurality of load terminals. Second interrupting contacts are disposed between at least one of the plurality of receptacle load terminals and at least one of the plurality of feed-through load terminals. The second interrupting contacts are initially disposed in an open state. The second interrupting contacts are closed in response to the plurality of line terminals being coupled to a source of AC power. At least one fault condition is sensed in the electric circuit. A fault condition signal is generated in response to the step of sensing. The first interrupting contacts are tripped in response to the fault condition signal, whereby the plurality of line terminals are decoupled from the plurality of load terminals.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
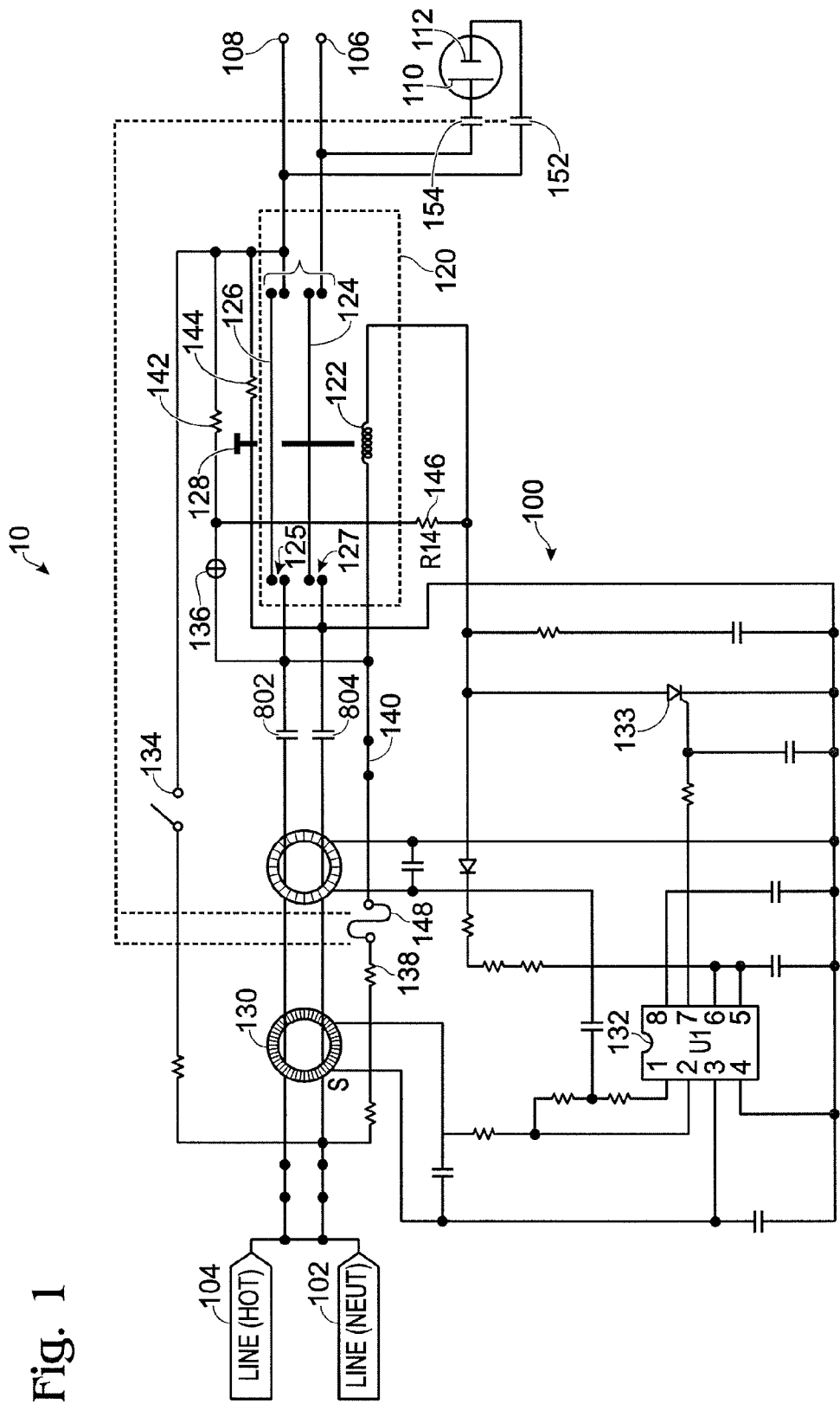
FIG. 1 is a schematic of a protective device in accordance with one embodiment of the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the protective device of the present invention is shown in FIG. 1, and is designated generally throughout by reference numeral 10.

As embodied herein and depicted in FIG. 1, a schematic of a protective device in accordance with one embodiment of the present invention is disclosed. In particular, FIG. 1 provides a schematic diagram of GFCI 10. Device 10 includes a neutral line terminal 102 and a hot line terminal 104. When device 10 is in service, these terminals are connected to an AC power source, e.g., the wiring connected to the distribution panel. Device 10 also includes a neutral feed through terminal 106 and hot feed through terminal 108. These terminals provide electrical power to downstream, daisy-chained receptacles or switches that are often included in the branch circuit. Device 10 also includes neutral receptacle terminal 110 and hot receptacle terminal 112. The receptacle terminals, of course, provide appliances equipped with corded plugs access to AC power.

The line terminals 102, 104, are coupled to a sensor 130, which in a GFCI, is typically a differential transformer. Sensor 130 is coupled to detector circuit 132. When differential transformer 130 senses a differential current, i.e., unequal amounts of current flowing in the hot and neutral conductors, due to a ground fault condition, detector 132 provides a fault detection signal on an output line. The output is coupled to silicon controlled rectifier (SCR) 133. SCR 133 is configured to be turned ON by the fault detection signal. SCR 133 is further coupled to solenoid 122. When SCR 133 conducts, solenoid 122 is energized. Solenoid 122 includes an armature. When solenoid 122 is energized the armature actuates circuit interrupter 120. Circuit interrupter 120 electrically decouples the line terminals from the load terminals in response thereto.

In particular, when solenoid 122 magnetically actuates the armature, circuit interrupter 120 displaces bus bars 124 and 126 to open the contacts. This is commonly referred to as the tripped position. In the tripped position, air gaps 125 and 127 are introduced when the receptacle load terminals 110, 112 and feed through load terminals 106, 108 are disconnected from line terminals 102, 104. Of course, this interrupts the flow of hazardous current through the fault condition.

In the embodiment shown in FIG. 1, a manual reset button 128 is coupled to circuit interrupter 120. When the reset button 128 is depressed, bus bars 124 and 126 are driven into a reset state, reconnecting the load terminals 106, 108 and the receptacle terminals 110, 112 to the line terminals 102, 104. In the reset state, the air gaps 125 and 127 are eliminated.

It will be apparent to those of ordinary skill in the pertinent art that modifications and variations can be made to circuit interrupter 120 of the present invention depending on cost and size considerations. For example, circuit interrupter 120 may include bus bars, cantilever beams, or any other suitable structure. Circuit interrupter 120 may also be a solid state device that is tripped or reset electronically and that interrupts load current by way of semiconductor switches.

In one embodiment, device 10 is periodically tested by a circuit that automatically establishes a periodical simulated fault condition. Reference is made to U.S. Pat. No. 6,674,289, patent application Ser. No. 10/668,654, patent application Ser. No. 10/758,530, and patent application Ser. No. 10/868,610, which are incorporated herein by reference as though fully set forth in its entirety, for a more detailed explanation of various embodiments of the automatic test circuit.

In another embodiment, as shown in FIG. 1, device 10 may be tested by operating a manual test button 134. When depressed, test button 134 generates a simulated fault condition. The test result may be displayed by a visual or audible indicator 136. A successful test result may also be indicated by movement of reset button 128. In particular, the test is conducted to determine whether the fault circuitry and/or the circuit interrupter is responsive to a fault. Accordingly, reset button 128 is configured to move from a reset position to a tripped position in response to a successful test.

In another embodiment, if the device is already in a tripped state and the test is unsuccessful, device 10 prevents circuit interrupter 120 from being reset, and/or being able to maintain a reset condition. If the device is reset by the user, it will immediately trip thereafter.

A miswire circuit is coupled between line terminals 102 and 104. The miswire circuit includes a fault resistance 138 that is designed to generate a difference current in excess of a predetermined fault threshold. The fault threshold typically exceeds the level of differential current that the GFCI has been designed to interrupt, typically 6 milliamperes. The miswire resistance 138 is on the line side of circuit interrupter 120 and electrically coupled to line terminals 102 and 104. When the GFCI 10 is both tripped and miswired, i.e., when power is supplied to the load terminals, nothing visible happens, but there is no power to the receptacle terminals 110, 112.

If the GFCI is in the reset condition, it will immediately trip when power is applied to the load side. Further, the device will trip before miswire resistance 138 opens because the current flowing through the miswire resistance 138 is interrupted when the device trips. The estimated time it takes for the miswire resistance 138 to "clear," or burn out, is greater than 50 ms. The trip time of the GFCI is less than or equal to 25 ms. If one attempts to reset the device when in the miswired condition, the device repeatedly trips out until such time as the device is wired correctly. GFCI 10 will not operate until the device is properly wired.

On the other hand, when electrical power is connected in a correct manner to the line terminals, a differential current is created by the miswire resistance 138. If the device is reset before power is applied, the device trips as a result of this differential current. If the device is already in the tripped condition before power is applied, nothing visible happens. However, because the miswire resistance is on the line side of the circuit interrupter 120, current through fault resistance 138 continues to flow, regardless of whether the circuit interrupter 120 is in the tripped condition. As noted previously, the current through miswire resistance 138 causes the resistance to clear itself in a short time, typically 50 ms to 5 seconds. This can be accomplished by selecting a resistor or resistors whose power rating is greatly exceeded by the current.

In an alternate embodiment, a fuse 148 is provided in series with the miswire resistance 138. The fuse is characterized by a properly selected $I^2t$ rating such that the fuse blows instead of the miswire resistance 138. Once the device has been properly wired with power connected to the line terminals and the fault has been cleared, device 10 may be reset and provide its normal protective functions.

An interesting issue with respect to miswire protection relates to performing Underwriters Laboratories required tests, such UL-943, during the manufacture of the protective devices. The differential current produced by the miswire resistance 138 must not affect the test results, or cause the miswire resistance to clear in the manner previously described. One solution is to place a normally closed switch 140 in series with the miswire resistance 138.

With regard to the mechanical implementation of switch 140, switch 140 may be implemented using a flexible conductive spring arm that normally rests against a contact on the top side of a printed circuit board. A hole is disposed in the printed circuit board directly below the spring arm of switch 140. An additional hole is disposed below the first hole in the plastic back body of the GFCI device. When GFCI 10 is inserted into the test equipment to perform the aforementioned manufacturing tests, a mechanical test probe engages the spring aim of switch 140 through the two aforementioned holes. The probe causes the spring arm of switch 140 to be pushed away from the contact to open the differential current circuit path. Manufacturing testing may be performed without clearing miswire resistance 138. The last test performed on the GFCI device in the test sequence is to disengage the probe from the spring arm of switch 140. The differential current circuit path is reconnected to check the integrity of the differential current circuit path and other GFCI components. The reconnected path should cause the GFCI device to trip if it is operating properly.

In traditional protection devices, the circuit interrupter denies power to the line terminals from the feed-through terminals. However, the denial of power to the feed-through terminals does not guarantee that the miswired condition will be corrected by the installer. For example, the electrical distribution system may not include a daisy chained receptacle or switch, in which case the feed-through terminals are not used. While the traditional device may disconnect the line terminals from the load terminals, it is not configured to disconnect the receptacle load terminals from the feed-through load terminals. As such, traditional devices expose users to possible hazardous conditions when miswired. Thus there is a need to protect a user from a fault condition in the user attachable load even when the protective device has been miswired.

In the present invention the need is addressed by interposing miswire contacts 152, 154 between the hot feed-through terminal 108 and hot receptacle terminal 112, respectively. Contacts 152, 154 are configured to electrically disconnect the hot feed-through terminal 108 and hot receptacle terminal 112 when device 10 is miswired. Thus, power to a fault condition in the user attachable load is cut off by contacts 152. Once the miswired condition has been corrected, miswiring contacts 152 are configured to close, to thereby establish electrical connection between the load terminals 106,108 and receptacle terminals 110, 112. In another embodiment, only contact 152 is implemented between the hot load contact and the hot receptacle contact. Miswire contacts 152, 154 may be implemented using any suitable type of contacts, including a mechanical contact arrangement, a solid state contact arrangement, or any of the other miswire contact arrangements disclosed herein.

However, the use of both contacts provides more protection because contact 154 serves to protect the user from a fault condition in the user attachable load when the voltage source has been miswired to the feed-through terminals and when the hot and neutral conductors from the voltage source have been transposed. When the conductors are transposed, the shock (or fire) hazard shifts from receptacle hot load terminal 112 to receptacle neutral load terminal 110. The contact pair 152, 154 protect the user regardless of how the power source has been wired to the feed-through terminals. In yet another embodiment, contacts 154 are included but contacts 152 are not included. This embodiment also denies power to the user attachable load when the device has been miswired. The denial of power motivates the user to correct the miswired condition before a fault condition in the user attachable load is likely to take place.

Referring back to FIG. 1, the circuit includes resistors 142,144,146, and indicator light 136. Light 136 is a trip indication light. The light is off if GFCI 10 is in the reset condition, and illuminates if the GFCI 10 is tripped. If device 10 is miswired, light 136 is off, regardless of whether the device is reset or tripped. If device 10 is properly wired, allowing a reset condition to be maintained, light 136 is off. If device 10 is properly wired and tripped, light 136 is illuminated. Light 136 may also serve to notify the user that the solenoid-driving device is defective and that device 10 is no longer operational. Light 136 may be replaced by an audible device. As such, the present invention may include a visual and/or audible indicator. The indicator may have multiple indication meanings.

The indicating circuit operates as follows. When the device 10 is wired properly, and the device is reset, light 136 is off. The circuit interrupter 120 is closed (reset) and no voltage is present across light 136 and resistor 144. If the GFCI trips for any reason, light 136 is energized by line voltage being applied across light 136 and resistors 144 and 142. When the circuit interrupter 120 is reset, voltage is removed and light 136 turns off. If the device is miswired, light 136 is off when the circuit interrupter 120 is reset. However, when the device trips in this condition, there is no return path to neutral through resistor 142. Accordingly, light 136 does not turn on as it would if the GFCI were wired properly. This feature is not dependent on the miswire resistance 138. Thus, if the miswire detection circuit has been previously used and the miswire resistance cleared, miswire detection is still possible by energizing light 136 in conjunction with tripping the GFCI 10.

Turning now to end-of-life indication, the circuit branch that includes resistor 146 is used to indicate that SCR 133 (i.e., the solenoid driving device) is defective. When SCR 133 short circuits, a current path to supply neutral is established via resistor 146 to thereby energize light 136. Note that trip solenoid 122 will open within a few seconds if the line voltage is continuously applied to it. This is exactly the outcome when SCR 133 short circuits. If solenoid coil 122 burns out, device 10 may no longer be tripped after being reset. On the other hand, light 136 remains energized, indicating a defective solenoid driving device. The value of resistor 146 must be kept low relative to the value of resistor 144, since the two resistors form a voltage divider that limits the voltage across light 136. If light 136 is a neon lamp, the values of resistors 144 and 146 are chosen to apply about 60 volts. This voltage level allows the lamp to arc and energize. In this embodiment, resistor 146 is typically 33 K. This resistance value results in approximately 66 volts being applied across the neon lamp at a worst case line voltage of 102 VAC.

To summarize the switch states, when device 10 is wired properly and reset, indicator 136 is OFF. When device 10 is wired properly and tripped, indicator 136 is ON. When an end-of-life condition occurs, indicator 136 is ON in the reset state. Finally, when device 10 is miswired and tripped, indicator 136 will be OFF.

Figure 2:
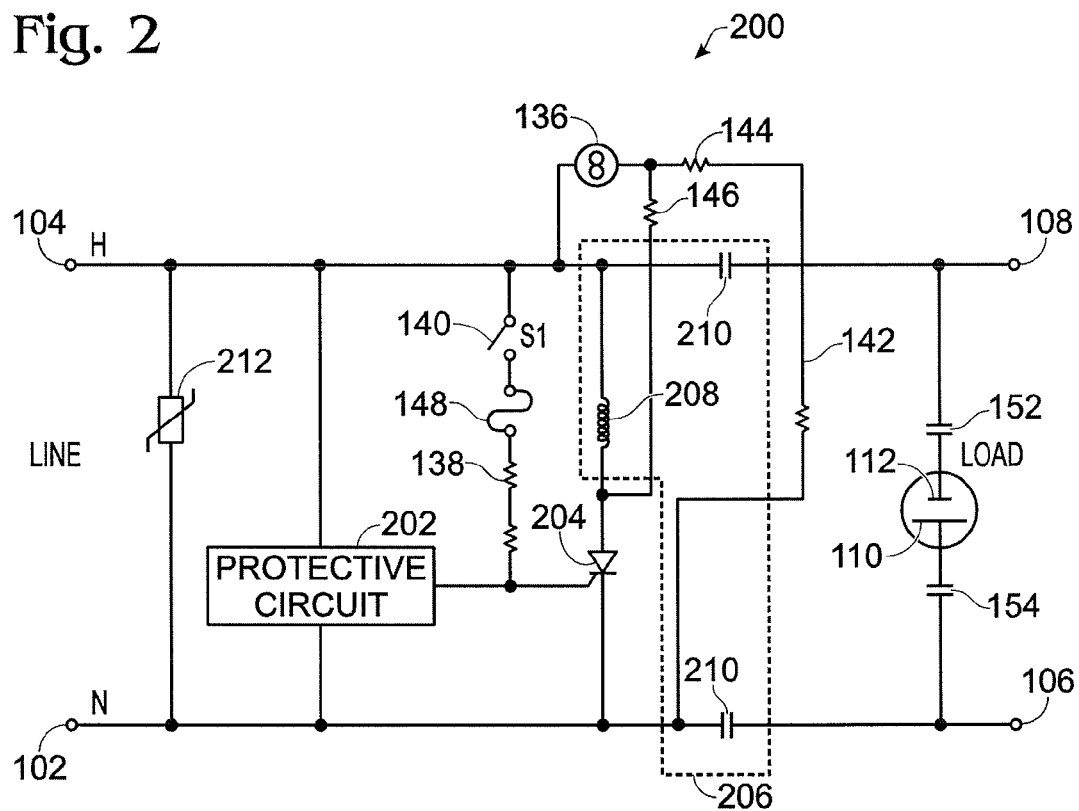
FIG. 2 is a schematic diagram of a protective device in accordance with another embodiment of the present invention.

As embodied herein and depicted in FIG. 2, a schematic diagram in accordance with another embodiment of the present invention is shown. Protective device 200 is a general diagrammatic depiction of a protective device in that it may be applied to various protective devices such as ground fault circuit interrupters (GFCIs), arc fault circuit interrupters (AFCIs), or combination devices that provide both AFCI and GFCI protection. The present invention should not be construed as being limited to the examples listed above. Thus, protective circuit 202 may be configured to detect any number of fault conditions, including ground faults, arc faults, or both. The protective circuit 202 may include self-diagnostics for detecting an end-of-life condition in the circuit 202 and/or circuit interrupter 206.

As shown in FIG. 2, protective circuit 202 is coupled between the line terminals 102, 104. The output of the protective circuit is coupled to SCR 204. Solenoid 208 is disposed between SCR 204 and the hot line conductor. The miswire detection circuit, including miswire resistor 138, is disposed in parallel to solenoid 208. Solenoid 208 is, in turn, coupled to interrupting contacts 210, in the manner previously described. During operation, protective circuit 202 provides SCR 204 with a fault detection signal. SCR 204 begins to conduct to thereby energize solenoid 208, causing the circuit interrupter 206 to trip contacts 210. As a result, load terminals 106, 108, 110, and 112 are disconnected from line terminals 102, 104. Of course, the circuit interrupter 206 may be implemented using bus bars, cantilevers or other similar structures configured to form an air gap, or by turning off one or more solid state switch.

Resistors 142, 144, 146, and light 136 are similar to, and have the same functionality as, the circuits depicted in FIG. 1. However, the miswire circuit in FIG. 2 operates in a different manner by directly signaling SCR 204. If device 200 is in the reset state and power is miswired to the load terminals, current flows through normally closed switch 140, fuse 148, miswire resistance 138 to cause SCR 204 to activate solenoid 208. Interrupting contacts 210 are opened and device 200 is tripped. Fuse 148, if provided, and miswire resistance 138 are chosen to withstand the current flow for the time that power is applied to the load terminals to the moment when interrupting contacts 210 open, which is approximately 25 milliseconds. If line power is connected as intended to the line terminals of the protective device, current flows through normally closed switch 140, fuse 148, miswire resistance 138, and SCR 204 until such time as resistance 138 clears, or fuse 148 (if provided) clears. Afterwards, device 200 may be reset.

Accordingly, the miswire detection functionality of the circuit shown in FIG. 2 differs from the miswire protection circuit in FIG. 1 in that the miswire detection signal does not necessarily have to be routed through the fault detection circuitry. The fault detection circuit of FIG. 1 evaluates the miswire detection signal as it would a fault condition signal. On the other hand, the miswire detection signal of FIG. 2 by-passes the fault detection circuit and is applied directly to SCR 204. In another embodiment, the miswire detection signal is gated with the fault detection signal to create a Boolean output that is interpreted by detection circuitry.

Solenoid 208 is designed not to burn out during the interval that SCR 204 is turned ON. The interval is typically on the order of approximately 100 milliseconds. Accordingly, the miswire protective functionality described in the embodiment shown in FIG. 1 is provided without necessarily requiring a differential current transformer 130 to detect the miswired condition. Further, neither the miswire resistance nor the fuse circuit need be attached to both the hot and neutral line conductors. If an electronic switching device other than an SCR is used, e.g., a bipolar transistor, the connection to the gate of the SCR would instead be made to the base of the bipolar transistor.

The miswire resistance 138 or fuse 148 (if provided) are susceptible to damage from lightning storms and types of loads that impose voltage impulse transients on the electrical distribution system. The susceptibility may be eliminated by electrically coupling a metal oxide varistor (MOV) 212 across the line terminals. There are many alternate methods for suppressing voltage transients. Reference is made to U.S. patent application Ser. No. 10/964,217 and the U.S. Patent Application corresponding to Ser. No. 11/080,574, which are incorporated herein by reference as though fully set forth in its entirety, for a more detailed explanation of alternate methods for suppressing voltage transients.

As previously described, contacts 152 and/or 154 serve to protect the user from a fault condition in the user attachable load. The contacts are configured to open in response to a miswire condition. The contacts are configured to close (or be closeable) if the protective device has been properly wired.

Figure 3:
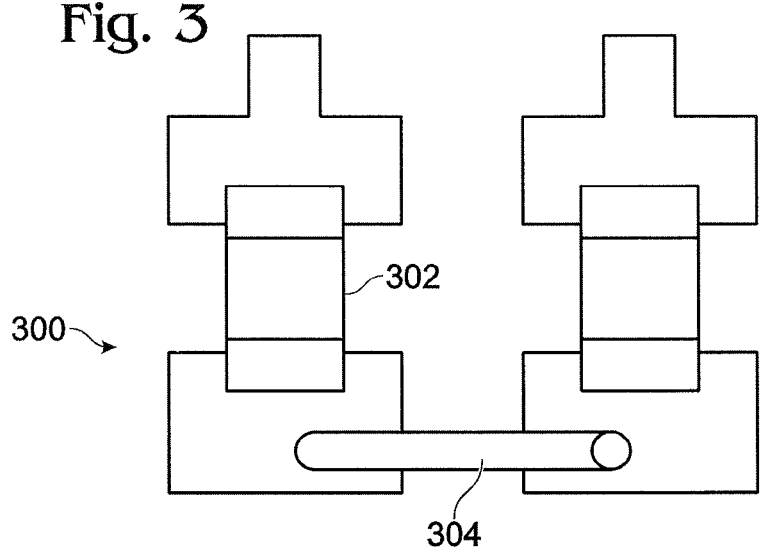
FIG. 3 is a plan view of a mechanical implementation of a miswire resistance circuit in accordance with the present invention.

Referring to FIG. 3, a plan view of the miswire resistance circuit 300 is shown. Circuit 300 includes at least one heating device such as resistor 302 in combination with wire 304. Wire 304 has a predetermined melting point. When device 10 is properly wired, resistor 302 produces $I^2R$ heating. When the temperature rises above the pre-determined threshold, wire 304 melts and an air gap is formed. The air gap is configured to block surge currents resulting from impulse voltages. It will be apparent to those of ordinary skill in the pertinent art that modifications and variations can be made to wire 304 of the present invention depending on the desired temperature threshold and the value of the resistance chosen. Accordingly, wire 304 may be of any number of alloys familiar to those skilled in the art, including tin/lead alloys.

Figure 4:
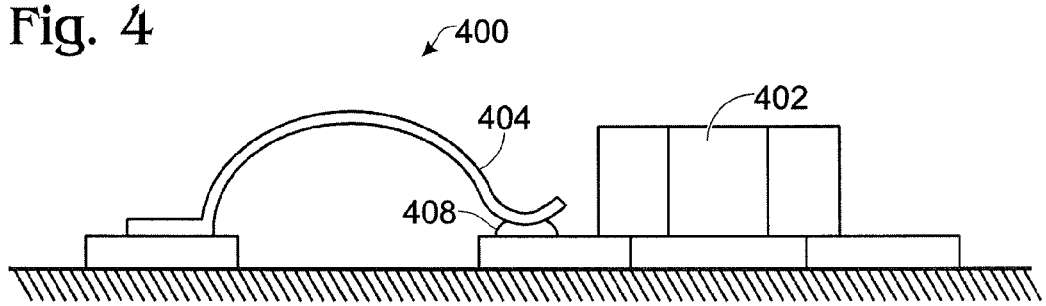
FIG. 4 is a side view of a mechanical implementation of a miswire resistance circuit in accordance with another embodiment of the present invention.
Figure 5:
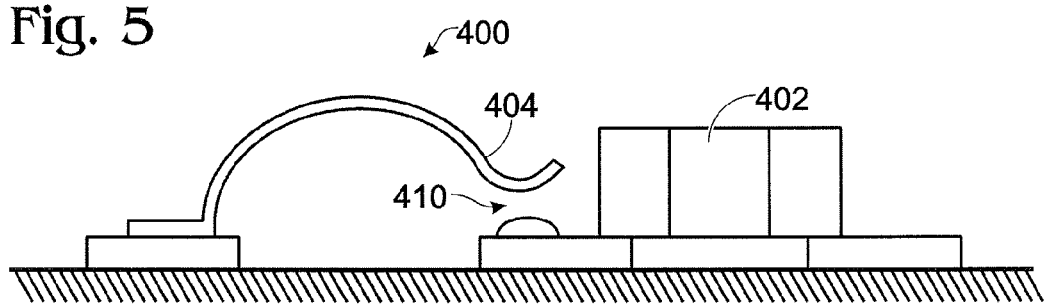
FIG. 5 is a side view of the miswire circuit shown in FIG. 4 in an open state.

Referring to FIG. 4 and FIG. 5, a second mechanical implementation of the miswire circuit is shown. FIG. 4 is an elevation view of miswire circuit 400 in a closed state. Miswire circuit 400 includes at least one heating resistor 402 coupled to a spring member 404 by connective element 408. Connective element 408 may be implemented using solder, or some other similarly conductive alloy. Spring member 404, solder 408, and miswire resistor 402 are electrically continuous in a closed state. Of course, connective element 408 is designed to have a predetermined melting threshold. When device 10 is properly wired, resistor 402 produces $I^2R$ heating. When the temperature rises above the pre-determined threshold, connective element 408 melts, spring member 404 is released, and an air gap 410 is formed.

FIG. 5 is an elevation view of the miswire circuit 400 depicted in FIG. 4 in an open state. As alluded to above, once the solder attachment 408 fails, spring 404 opens to a pre-biased position to form an air gap 410.

Figure 6:
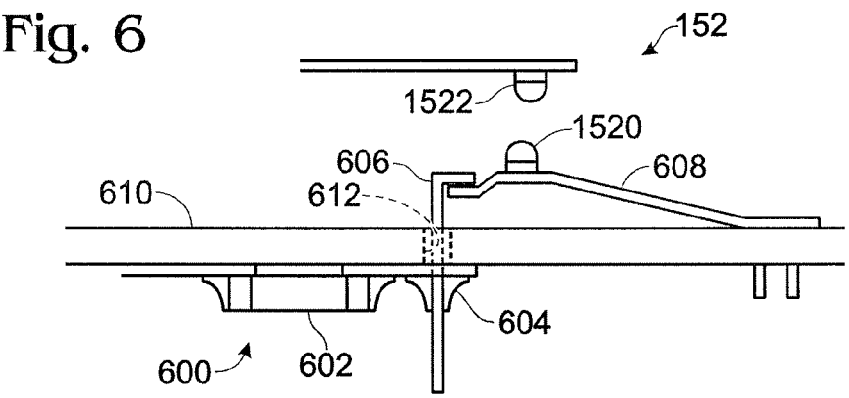
FIG. 6 is a sectional view illustrating a receptacle miswire contact structure in accordance with an embodiment of the present invention.

FIG. 6 is a sectional view illustrating a receptacle contact structure 152 in accordance with an embodiment of the present invention. While FIG. 1 shows two receptacle contacts 152, 154, FIG. 6 only shows one such contact structure (152) for ease of illustration. A duplicate structure may be implemented to form contact 154.

FIG. 6 shows the receptacle contacts 152 in an open state. Referring back to FIG. 1, contacts 152 disconnect the hot feed-through terminal 108 and hot receptacle terminal 112 until device 10 is wired properly. Thus, the implementation shown in FIG. 6 eliminates any potentially hazardous condition caused by a miswire condition. Once the miswired condition has been corrected, miswiring contacts 152, 154 are configured to close, to thereby establish electrical connection between the load terminals 106, 108 and receptacle terminals 110, 112.

Referring back to FIG. 6, miswire circuit 600 includes at least one heating resistor 602 coupled to arm 606 by way of connective element 604. Connective element 604 may be implemented using solder, or a connective element formed from a similarly conductive alloy. Miswire contacts 152 include a movable contact 1520 and a fixed contact 1522. Movable contact 1520 is disposed on spring member 608. Spring member 608 is coupled to circuit board 610. Arm 606 extends through a hole 612 formed in circuit board 610. At one end, arm 606 is fixedly attached to circuit board 610 by connective element 604. At the other end, arm 606 is connected to spring member 608. Accordingly, resistor 602, connective element 604, arm 606, spring member 608, and movable contact 1520 are electrically continuous. However, power is denied to the receptacles because of the air gap disposed between movable contact 1520 and fixed contact 1522, i.e., miswire contacts 152 are in an open state.

Figure 7:
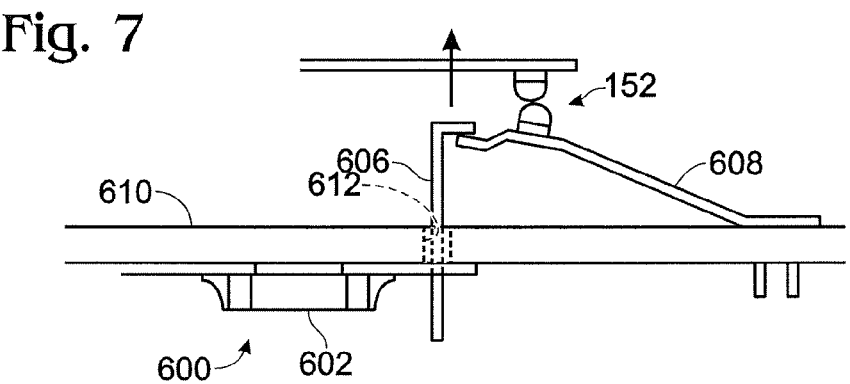
FIG. 7 is the miswire contact structure depicted in FIG. 6 in a closed state.

FIG. 7 is the miswire contact structure depicted in FIG. 6 in a closed state. In other words, once the installer properly wires device 10 such that the line terminals are connected to the AC power source (i.e., the wiring from the distribution panel), current begins to flow through resistor 602 generate $I^2R$ heating in the manner previously described, causing the temperature of connective element 604 to exceed a predetermined temperature threshold. Once the connective element fails, arm 606 is released, and becomes slidable. Because spring member 608 is biased toward the closed state, arm 606 moves in the direction shown to close contacts 152. Once contacts 152 have closed, miswire resistance 602 is configured to open. Opening may be accomplished by clearing fuse 148 (FIGS. 1, 2), clearing resistor 602, or failure of solder attachment 604.

Figure 8:
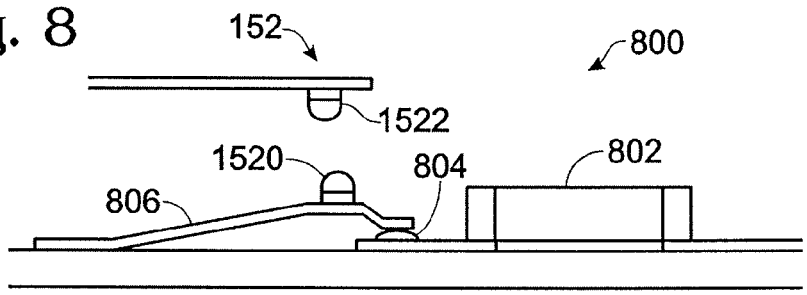
FIG. 8 is a sectional view illustrating a second receptacle miswire contact in an open state in accordance with the present invention.

FIG. 8 is a sectional view illustrating a receptacle contact structure 152 in accordance with an alternate embodiment of the present invention. In this embodiment, miswire circuit 800 includes at least one heating resistor 802 and a spring member 806 that is fixedly attached near, or to, one lead of resistor 802 using solder element 804. As noted above, the solder connection may be replaced by any suitable means for releasably attaching spring 806 to resistor 802. For example, solder element 804 may be replaced by a similarly conductive alloy. As shown by FIG. 8, resistor 802, connective element 804, spring member 806, and movable contact 1520 are electrically continuous. On the other hand, an air gap exists between fixed contact 1522 and movable contact 1520. Accordingly, power is denied to the receptacles 110, 112 (FIG. 1) because device 10 has not been properly wired.

Figure 9:
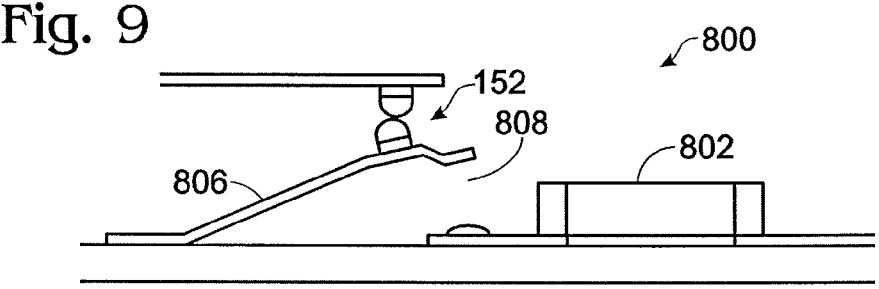
FIG. 9 is the miswire contact structure depicted in FIG. 8 in a closed state.

FIG. 9 shows the mechanical implementation depicted in FIG. 8 in a closed state. Once the installer properly wires device 10 such that the line terminals are connected to the AC power source (i.e., the wiring from the distribution panel), current begins to flow through resistor 802 generate $I^2R$ heating in the manner previously described, causing the temperature of connective element 804 to exceed a predetermined temperature threshold. Once the connective element 804 fails, spring 806 is released. Spring member 806 is biased toward the closed state and moves to close contacts 152 once released, foaming air gap 808.

Figure 10:
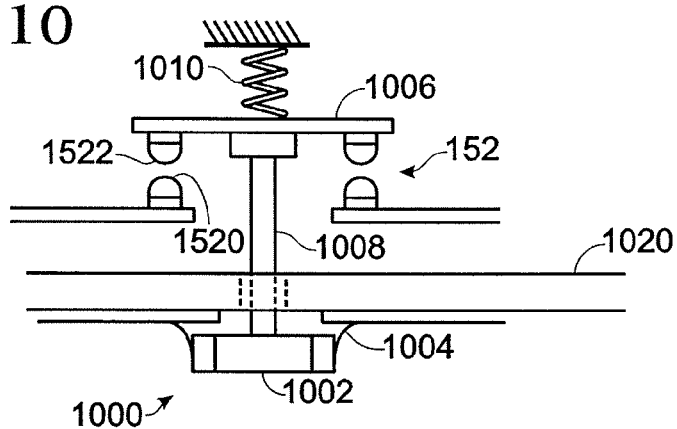
FIG. 10 is a sectional view illustrating a third receptacle miswire contact in an open state in accordance with the present invention.

FIG. 10 is an alternate embodiment of a receptacle miswire contact structure. Miswire circuit 1000 includes at least one heating resistor 1002 attached using solder 1004, or a similarly conductive alloy. Resistor 1002 is mechanically coupled to plunger 1008. Plunger 1008 extends from resistor 1004 through a hole in board 1020. Plunger 1008 is coupled to buss bar 1006. Spring member 1010 exerts a biasing force against bus bar member 1006. However, plunger 1008 is fixed in place by solder 1004 such that contacts 152 are open. When the protection device is properly wired, the solder attachment 1004 fails in the manner previously described.

Figure 11:
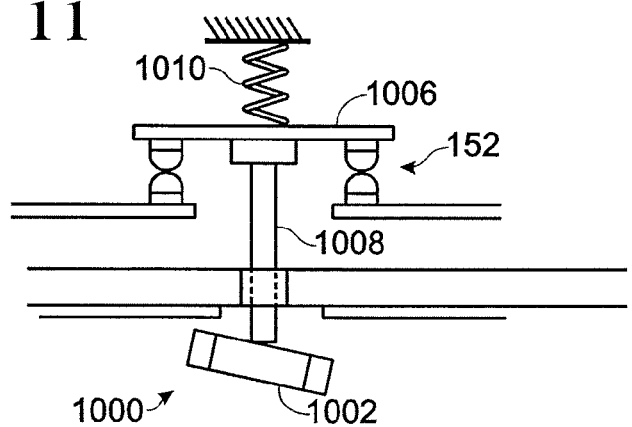
FIG. 11 is the miswire contact structure depicted in FIG. 10 in a closed state.

FIG. 11 shows the receptacle miswire contact structure depicted in FIG. 10 in a closed position. Again, Once device 10 is wired properly, current flows through resistor 1002 to thereby generate $I^2R$ heating of solder 1004. Of course, the solder 1004 gives way when the temperature exceeds a predetermined temperature threshold. Once the solder fails, resistor 1002 is pushed out of position by the movement of plunger 1008. Plunger 1008 is urged through the hole by the biasing force exerted by spring 1010. The force applied by spring 1010 moves contacts 152 into the closed state.

As noted previously, the embodiments provided above have been described with respect to hot conductor contacts 152. However, the structures disclosed herein are equally applicable to neutral conductor contacts 154.

Figure 12:
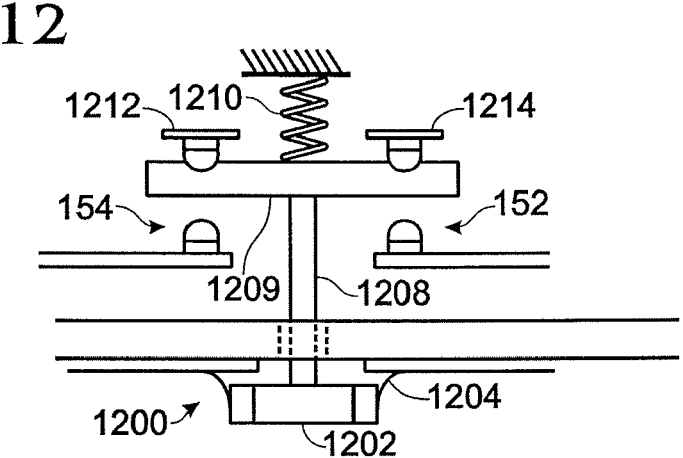
FIG. 12 is a sectional view illustrating a fourth receptacle miswire contact in accordance with the present invention.

As embodied herein and depicted in FIG. 12, yet another receptacle miswire contact arrangement in accordance with the present invention is disclosed. FIG. 12 is employs a single miswire circuit 1200 to couple both hot and neutral miswire contacts 152, 154 to their respective conductive paths. Miswire circuit 1200 includes at least one heating resistor 1202 attached using solder 1204, or some other similarly conductive alloy. Solder 1204 and miswire resistor 1202 are electrically continuous and therefore conduct electricity. Hot contact 152 and neutral contact 154 are disposed on movable arms 1212, 1214. Latch block 1208 is constructed of an electrically non-conductive material. Latch block 1208 is constrained between resistor 1202 and arms 1212, 1214, forcing contacts 154 and 152 into an open state. When the protection device is properly wired, the solder attachment 1204 fails, causing the resistor to give way. The force applied by spring 1210 moves contacts 152 and 154 into the closed state. In an alternate embodiment, arms 1212 and 1214 are spring members. In this embodiment, spring 1210 is not required. Of course, spring members 1212 and 1214 are pre-biased to close contacts 154 and 152 after solder attachment 1204 has failed.

In another embodiment, the body of fuse 148 may be used to capture latch block 1208 (or arm 1008.) After device 10 has been properly wired, the clearing of fuse 148 permits motion of the latch block (or arm) to close the miswire contacts.

Figure 13:
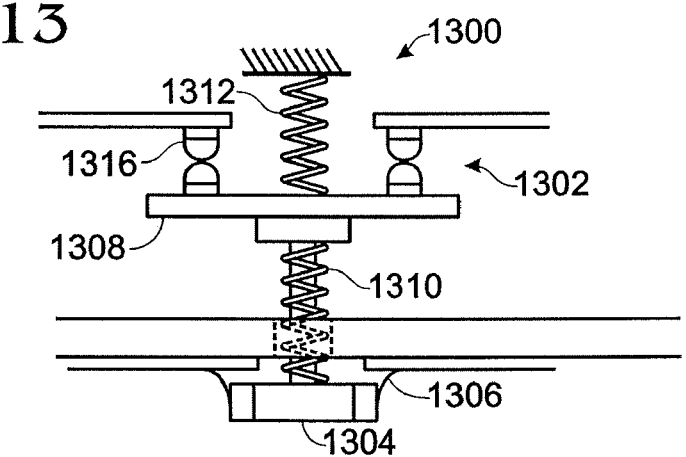
FIG. 13 is a sectional view of an end-of-life mechanism in an operational state in accordance with the present invention.

Referring to FIG. 13, an end-of-life mechanism 1300 is depicted. Mechanism 1300 is configured to permanently disconnect the power source form the load terminals when device 10 is experiencing an end-of-life condition that would prevent device 10 from interrupting a predetermined fault condition. End-of-life conditions include one or more of the following: a failure in sensor 130, detector 132, SCR 133, or circuit interrupter 120.

Mechanism 1300 includes end-of-life contacts 1302, 1316, that are operated essentially in a different manner than miswire contacts, e.g., contacts 1302, 1316 are in the closed state at the time of installation and throughout the life of the product and are configured to open when an end-of-life condition has occurred. Contacts 1302, 1316 are disposed in series with circuit interrupter 120 (refer to FIG. 1.) Mechanism 1300 includes at least one heating resistor 1304 attached using solder 1306, or another similarly conductive alloy. Solder 1306 and resistor 1304 share electrical continuity, and therefore are in a conductive state. Contacts 1302 are connected to bus bar 1308. Spring 1310 is constrained between resistor 1304 and bus bar 1308 to close contacts 1302.

Figure 14:
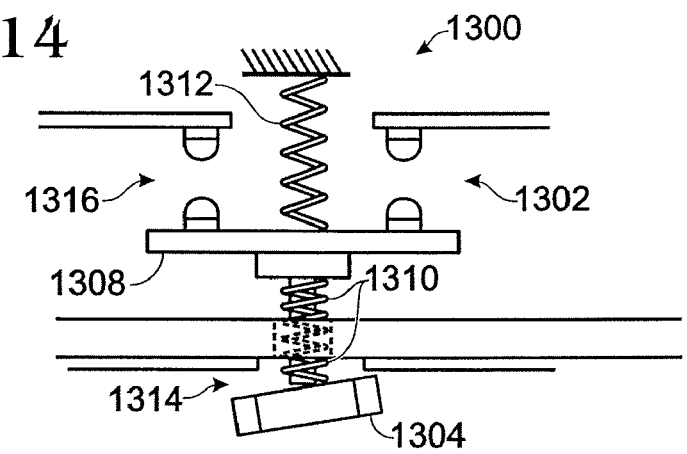
FIG. 14 is the end-of-life mechanism depicted in FIG. 13 is an end-of-life state.

FIG. 14 is an elevation view of the end-of-life mechanism depicted in FIG. 13 in an end-of-life state. When the protection device reaches an end-of-life condition, current through the heating resistor 1304 begins to flow. The solder attachment 1306 fails once the temperature level exceeds the melting point of the solder. At that point resistor 1304 is pushed away by the action of spring 1312 and spring 1310, which are no longer constrained by resistor 1304. The force applied by spring 1312 moves contacts 1302 into the open state. Force applied by spring 1312 may also break electrical continuity to resistor 1304 by forming an air gap 1314.

As noted above, the end-of-life mechanism described in FIGS. 13 and 14 includes contacts 1302 that are disposed between the hot line and hot load terminals. In an alternate embodiment, another set of end-of-life contacts (not shown) are disposed between the neutral line and neutral load terminals in a manner similar to the arrangement shown in FIG. 12. Both sets of contacts (1302, neutral path contacts) may be operated by a single resistor in a similar manner as has been described in FIG. 12.

Those of ordinary skill in the art will recognize that the end-of-life mechanism and miswire contacts described herein may both be included in device 10.

Figure 15:
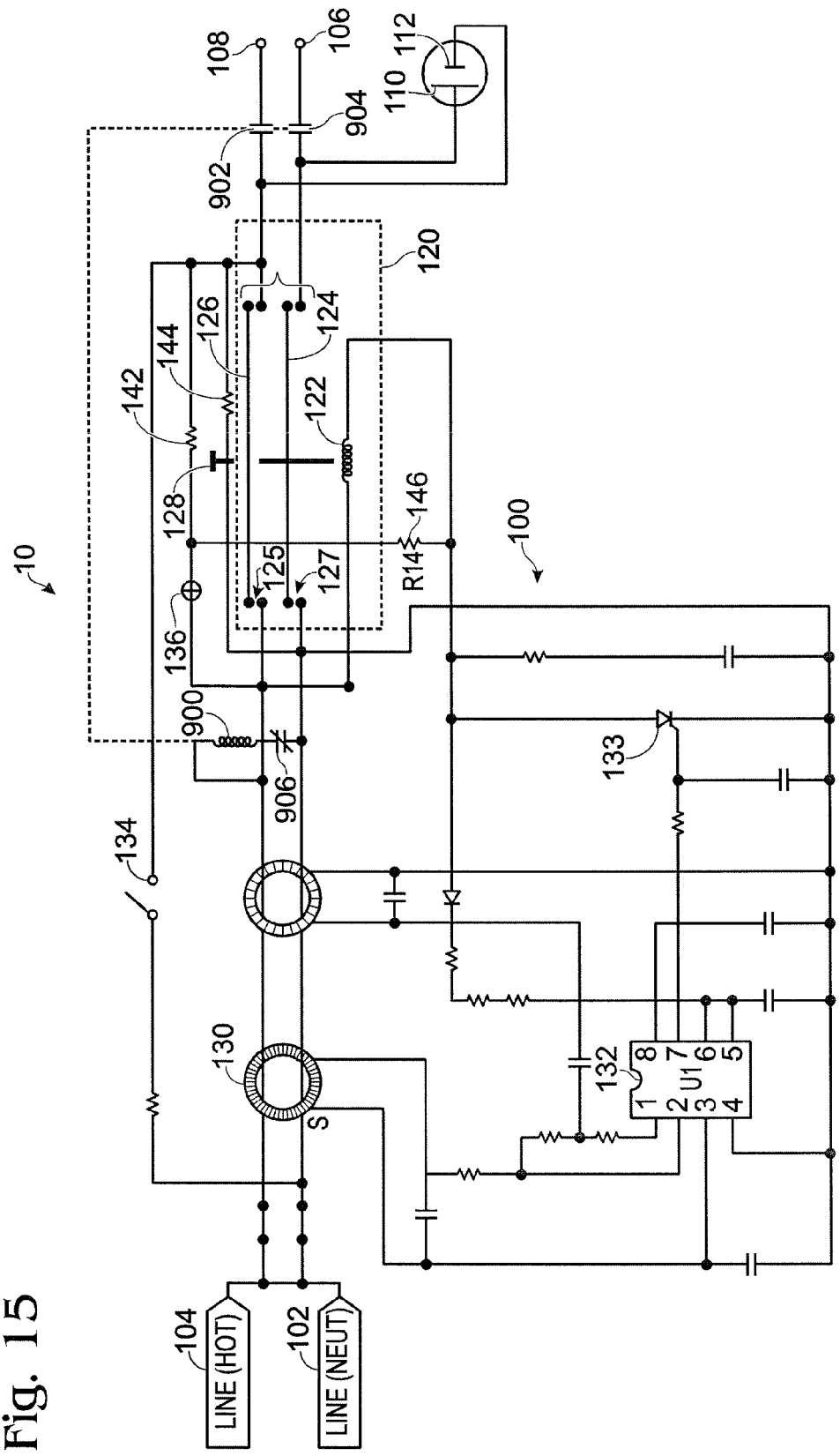
FIG. 15 is a schematic of a protective device in accordance with yet another embodiment of the present invention.

As embodied herein and depicted in FIG. 15, a schematic of a protective device in accordance with yet another embodiment of the present invention is disclosed. The fault detection circuitry includes sensor 130 coupled to detector 132. If a fault is present, detector 132 provides a fault detection signal to SCR 133 causing it to conduct. When SCR 133 conducts, solenoid 122 is energized causing its armature to actuate interrupting contact assembly 120.

Device 10 also includes miswire contacts 902 and/or 904. Miswire contacts 902, 904 disconnect the feed-through load terminals 108, 106 from the receptacle load terminals 112, 110 respectively. Contacts 902, 904 are coupled to miswire solenoid 900. When device 10 has been miswired, the source voltage from the electrical distribution system is connected to feed-through terminals 106, 108. There is no voltage applied to solenoid 900 because contacts 902, 904 are in the open state. Since contacts 902, 904 cannot close until voltage is applied to solenoid 900, the contacts remain in the open state. On the other hand, when device 10 is properly wired, voltage is applied to solenoid 900, and solenoid 900 is energized causing contacts 902, 904 to close. The configuration results in permanent closure of contacts 902, 904. The device may employ a magnetic latching device such as a permanent magnet or a mechanical latching device. Those skilled in the art will recognize that any suitable latching mechanism may be employed herein.

In an alternate embodiment, contacts 902, 904 re-open each time there is loss of source voltage on the line terminals. In this manner, the miswire detection feature is available each time device 10 is removed from the installation and re-installed. Another alternate embodiment includes miswire solenoids that are intended to be only momentarily connected to voltage. Such solenoids overheat if connected to a permanent voltage. The overheating problem is resolved by disposing contacts 906 in series with solenoid 900. Contacts 906 are opened after contacts 903, 904 have successfully closed. Closure of contacts 906 may be accomplished by coupling them to solenoid 902 or to contacts 902, 904.

Those skilled in the art will recognize that circuit interrupter 120 is constructed to reliably perform many trip/reset operations. In particular, device 10 is typically designed to perform 3,000 trip/reset cycles. On the other hand, miswire contacts 152 154 (FIGS. 1, 2) and miswire contacts 902, 904 (FIG. 15) may be actuated only a handful of times over the course of the operating life of device 10. End-of-life contacts 1302, 1304 (FIGS. 13-14) may be actuated only once—when the device reaches an end-of-life state. Accordingly, miswire contacts and end-of-life contacts may be implemented using a simpler construction. For example, circuit interrupter 120 may be implemented using silver rivets. Such rivets provide reliable operation for a few thousand trip/reset operations. As such, they may be omitted, and a simpler, less expensive construction may be employed to implement the miswire contact assembly and the end-of-life contact assembly.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A device comprising:
a housing assembly including a plurality of line terminals, a plurality of load terminals, and a plurality of receptacle load terminals coupled to the plurality of load terminals by a plurality of conductors;
a circuit interrupting assembly disposed in the housing and coupled to the plurality of line terminals or the plurality of load terminals, the circuit interrupting assembly establishing electrical continuity between the plurality of line terminals and the plurality of load terminals in a reset state and interrupting the electrical continuity between the plurality of line terminals and the plurality of load terminals in a tripped state;
a wiring state detection circuit coupled to the plurality of line terminals or the plurality of load terminals; and
at least one switchable element coupled to the wiring state detection circuit, the at least one switchable element including a plurality of switching states, the at least one switchable element being disposed in at least one of the plurality of conductors coupled between the plurality of receptacle load terminals and the plurality of load terminals, the at least one switchable element being configured to change switching states in response to a stimulus generated by the wiring state detection circuit.

2. The device of claim 1, wherein the at least one switchable element includes switch contacts disposed between a hot receptacle load terminal and a hot load terminal or switch contacts disposed between a neutral receptacle load terminal and a neutral load terminal.

3. The device of claim 1, wherein the circuit interrupting assembly further comprises a fault detection circuit configured to generate a fault detection signal in response to detecting a signal having predetermined characteristics.

4. The device of claim 1, wherein the wiring state detection circuit further comprises a series circuit including at least one resistive element, the series circuit being coupled between the plurality of line terminals and the plurality of load terminals.

5. The device of claim 1, wherein the wiring state detection circuit further comprises:
a mechanical linkage coupled between a resistor and the at least one switchable element; and
a connective element mechanically coupling the resistor to the mechanical linkage, the connective element being comprised of a material having a predetermined melting temperature.

6. The device of claim 5, wherein the at least one switchable element includes a fixed contact and a movable contact, the mechanical linkage being disposed in at least one or both of a neutral conductive path and/or a hot conductive path, the mechanical linkage further comprising:
a latching arm coupled to the resistor by the connective element; and
a spring member including the movable contact disposed thereon, the spring member being latched by the latching arm, whereby an air gap is disposed between the movable contact and the fixed contact before the connective element is heated to a temperature greater than or equal to the predetermined melting temperature.

7. The device of claim 5, wherein the at least one switchable element includes a plurality of fixed contacts and a plurality of movable contacts, the mechanical linkage further comprising:
a plunger arm coupled to the connective element; and a buss bar member including the movable contacts disposed thereon, an air gap being disposed between the movable contacts and the fixed contacts before the connective element is heated to a temperature greater than or equal to the predetermined melting temperature.

8. The device of claim 7, further comprising at least one spring member coupled to the buss bar member, the spring member being configured to exert a biasing force to drive the buss bar member into a closed state.

9. The device of claim 1, wherein the circuit interrupting assembly includes an electronic switch actuator responsive to the wiring state detection circuit and a fault detection circuit.

10. The device of claim 1, wherein the wiring state detection circuit further comprises a switch configured to disable the wiring state detection circuit during manufacture of the device.

11. The device of claim 1, wherein the wiring state detection circuit further comprises a solenoid coupled between at least one of the plurality of line terminals and the at least one switchable element, the solenoid being energized to thereby drive the at least one switchable element into a closed state when an AC power source is applied to the plurality of line terminals.

12. The device of claim 1, wherein the at least one switchable element being configured to open in response to a loss of AC power on the plurality of line terminals.

13. The device of claim 1, further comprising an end-of-life mechanism configured to decouple the plurality of line terminals from the plurality of load terminals in response to an end-of-life signal from the circuit interrupting assembly.

14. The device of claim 13, wherein the end-of-life mechanism includes contacts that decouple the hot line terminal from the hot load terminals or decouple the neutral line terminal from the neutral load terminals in response to an end-of-life condition.

15. The device of claim 1, further comprising an indicator coupled to the circuit interrupting assembly, the indicator being turned ON in the tripped state.

16. A device comprising:
a housing assembly including a plurality of line terminals, a plurality of load terminals, and a plurality of receptacle load terminals;
a fault detection circuit coupled to at least one of the plurality of line terminals, the fault detection circuit being configured to generate a fault detection signal in response to detecting a signal having predetermined characteristics;
a circuit interrupter assembly coupled to the fault detection circuit, the circuit interrupter assembly being configured to electrically couple the plurality of line terminals and the plurality of load terminals in a reset state and decouple the plurality of line terminals from the plurality of load terminals in response to the fault detection signal in a tripped state;
a wiring state detection circuit coupled to the plurality of line terminals or the plurality of load terminals; and
a switch mechanism disposed between the plurality of load terminals and the plurality of receptacle load terminals and responsive to the wiring state detection circuit, at least one of the plurality of load terminals and at least one of the plurality of receptacle load terminals being disconnected when the switch mechanism is in an open state and the plurality of load terminals and the plurality of receptacle load terminals being connected when the switch mechanism is in a closed state.

17. The device of claim 16, wherein the switch mechanism includes switch contacts disposed between a hot receptacle load terminal and a hot load terminal or switch contacts disposed between a neutral receptacle load terminal and a neutral load terminal.

18. A device comprising:
a housing assembly including a plurality of line terminals, a plurality of load terminals, and a plurality of receptacle load terminals;
a fault detection circuit coupled to at least one of the plurality of line terminals, the fault detection circuit being configured to generate a fault detection signal in response to detecting a signal having predetermined characteristics;
a circuit interrupter assembly coupled to the fault detection circuit, the circuit interrupter assembly being configured to electrically couple the plurality of line terminals and the plurality of load terminals in a reset state and decouple the plurality of line terminals from the plurality of load terminals in response to the fault detection signal in a tripped state;
a wiring state detection circuit coupled to the plurality of line terminals or the plurality of load terminals, the wiring state detection circuit being configured to generate a wiring state detection response when the plurality of line terminals are connected to a source of AC power; and
at least one switchable element disposed between the plurality of load terminals and the plurality of receptacle load terminals, the at least one switchable element being configured to establish electrical continuity between the plurality of load terminals and the plurality of receptacle load terminals in response to the wiring state detection response and open circuit when the source of AC power is removed from the plurality of line terminals.

19. The device of claim 18, wherein the at least one switchable element includes switch contacts disposed between a hot receptacle load terminal and a hot load terminal or switch contacts disposed between a neutral receptacle load terminal and a neutral load terminal.

20. An electrical wiring device for use in a electrical distribution system, the comprising:
a housing assembly including a plurality of line terminals, a plurality of load terminals, and a plurality of receptacle load terminals, the housing assembly being configured to be disposed within a wall box;
at least one detection circuit coupled to the plurality of line terminals or the plurality of load terminals; and
a circuit interrupting assembly coupled to the at least one detection circuit and including at least one first interrupting contact disposed between the plurality of line terminals and the plurality of load terminals and at least one second interrupting contact disposed between the plurality of load terminals and the plurality of receptacle load terminals, the at least one first interrupting contact and the at least one second interrupting contact being separately actuatable, the at least one first interrupting contact being configured to electrically couple at least one of the plurality of line terminals to a corresponding at least one of the plurality of load terminals in a reset state and decouple the at least one of the plurality of line terminals from the corresponding at least one of the plurality of load terminals in a tripped state, the at least one second interrupting contact being configured to electrically couple at least one of the plurality of load terminals and a corresponding at least one of the plurality of receptacle load terminals in a closed state and disconnect the at least one of the plurality of load terminals from the corresponding at least one of the plurality of receptacle load terminals in an open state.

21. The device of claim 20, wherein the at least one detection circuit includes a fault detection circuit.

22. The device of claim 20, wherein the at least one detection circuit includes a test circuit.

23. The device of claim 22, wherein the test circuit automatically tests the device to determine whether the at least one detection circuit or the circuit interrupting assembly are functioning within predetermined performance parameters.

24. The device of claim 20, wherein the at least one detection circuit includes a wiring state detection circuit, the at least one second interrupting contact being configured to change switching states in response to a stimulus generated by the wiring state detection circuit.

25. The device of claim 24, wherein the at least one second interrupting contact is configured to open in response to a loss of AC power on the plurality of line terminals.

* * * * *